Dec. 27, 1960 J. I. WOOLF ET AL 2,966,302

DIGITAL ANALOGUE MULTIPLIER

Filed Aug. 9, 1956 4 Sheets-Sheet 1

DIGITAL ANALOGUE MULTIPLIER

Dec. 27, 1960 J. I. WOOLF ET AL 2,966,302

DIGITAL ANALOGUE MULTIPLIER

Filed Aug. 9, 1956 4 Sheets-Sheet 3

Dec. 27, 1960 J. I. WOOLF ET AL 2,966,302

DIGITAL ANALOGUE MULTIPLIER

Filed Aug. 9, 1956 4 Sheets-Sheet 4

2,966,302

Patented Dec. 27, 1960

2,966,302

DIGITAL ANALOGUE MULTIPLIER

Julius I. Woolf, Levittown, Pa., and Henry E. Zieman, Lexington, Mass., assignors to Research Corporation, New York, N.Y., a corporation of New York Filed Aug. 9, 1956, Ser. No. 603,035

6 Claims. (Cl. 235—151)

The present invention is directed toward a multiplier circuit and more particularly toward a device for producing a signal representative of the product of a digital quantity and an analogue quantity.

In the electronic art, it is sometimes desirable to provide a signal representative of the product of a digital and an analogue quantity without the use of auxiliary conversion equipment. Various multiplying devices in the past such as a digital multiplier for deriving the product of two digital quantities or an analogue multiplier for deriving the product of two analogue quantities required conversion equipment in addition to the multiplier equipment in order to convert the respective products from digital to analogue or vice versa. In addition to the added expense involved in the auxiliary conversion equipment, the longer time delay involved and the increased complexity of the apparatus resulting from the conversion equipment were further limiting factors. The present invention is directed toward a relatively simple electronic circuit for direct multiplication of digital and analogue quantities whereby the resultant signal corresponds in magnitude and sign to the product of the digital and analogue quantities.

Essentially the present invention includes two summing networks having a common output circuit, each network having a plurality of inputs corresponding in number to the maximum number of digits in the digital quantity. The analogue signal is selectively applied to these inputs under the control of the digital signals whereby the potential developed within said network is weighted in accordance with the magnitude of the digital signal. The resultant signal at the output circuit is an analogue signal corresponding in magnitude and sign to the product of said digital and analogue quantities.

Accordingly, a primary object of the present invention is to provide a digital-analogue multiplier.

Another object of the present invention is to provide a digital-analogue multiplier including a digital-to-analogue decoder circuit.

Still another object of the present invention is to provide a digital-analogue multiplier circuit wherein the digital signals control the analogue signal inputs to a summing network whereby the resultant potential developed in said summing network corresponds to the product of the digital and analogue signals.

A further object of the present invention is to provide a circuit for generating a signal equal to the product of an analogue signal and digital signals including a plurality of attenuation networks wherein one network is selectively energized by the analogue signal under the control of the digital signals.

Another object of the present invention is to provide a digital-analogue multiplier circuit including a pair of binary weighted multiple input attenuation networks one of which is selected by a digital signal to control the sign of the product signal, the inputs of which are selectively energized under the control of the remaining digital signals in a digital quantity to generate a signal corresponding in magnitude to the product of a digital and an analogue quantity.

Still another object of the present invention is to provide an improved digital-analogue multiplier wherein the waveform of the analogue signal is modified in accordance with a digital signal to produce a signal corresponding in magnitude to the product of a digital and an analogue quantity.

Another and still further object of the present invention is to provide a digital-analogue multiplier circuit wherein an analogue current signal is applied to selected inputs of an attenuation network in accordance with the magnitude of a digital quantity, the resulting potential developed in the attenuation network corresponding in amplitude to the product of the digital and analogue quantities.

Another object of the present invention is to provide an improved electronic circuit for multiplying an analogue quantity by a digital quantity including a pair of substantially identical attenuation networks controlling a common load device, each attenuation network including a plurality of binary weighted attenuation sections, the network to be energized being selected by one of the digital signals and the attenuation sections within such network to be energized being controlled by the corresponding signal in the digital quantity.

Still another object of the present invention is to provide an improved digital-analogue multiplier including a pair of attenuation networks, each network including a plurality of attenuation sections corresponding to the digits in said digital quantity connected in tandem, the digital quantity controlling the attenuation sections in one of said networks to which a common analogue signal is applied whereby the resulting signal developed by said attenuation network corresponds to the product of said digital and analogue quantities.

A further object of the present invention is to provide an improved multiplier circuit including a pair of ladder attenuation networks connected to a common load, each network effectively comprising a plurality of serially-connected attenuation sections wherein an analogue quantity is selectively applied to attenuation sections under the control of a digital quantity, the resulting signal at said common load corresponding to the product of said digital and analogue quantities.

Another object of the present invention is to provide a vector generator circuit for generating a vector on the screen of a cathode ray tube by generating deflection signals corresponding in magnitude to the product of a digital and an analogue quantity.

Still another object of the present invention is to provide an electronic circuit including a pair of substantially identical digital-analogue multiplier circuits adapted to generate signals corresponding to the product of digital and analogue quantities which when applied to opposing deflection plates of a cathode ray tube cause a vector to be generated thereon.

Another and still further object of the present invention is to provide a circuit for generating deflection signals in accordance with digital and analogue data applied thereto, the analogue quantities in the form of sawtooth current waves being suitably converted under the control of the digital signals to sawtooth deflection potentials corresponding in magnitude to the product of the digital and analogue signals.

Another object of the present invention is to provide a circuit for generating potentials which when applied to the deflection plates of a cathode-ray tube cause a vector to be generated thereon, the magnitude of the vector being controlled by digital-analogue multiplier circuits responsive to digital and analogue quantities to generate deflection potentials corresponding in magnitude to the product of the digital and analogue quantities.

Other objects of the invention will be pointed out in the following description and claims and illustrated in the accompanying drawings, which disclose, by way of example, the principle of the invention and the best mode, which has been contemplated, of applying that principle.

The subject apparatus includes two substantially identical attenuation networks connected to a common output circuit, each network comprising a plurality of serially-connected attenuation sections. Only one network may be energized during a multiplication operation, the particular attenuation sections in the selected network to be energized being determined by the digits in said digital quantity. To perform a multiplication operation, the analogue quantity is applied to the selected attenuation network under the control of signals representing the digital quantity. In the preferred embodiment, the analogue quantity is a substantially linear sawtooth signal while the digital quantity controls electronic switching means to apply the analogue signal to the selected attenuation sections. The resulting product signal at the output circuit of the attenuation network is equal in duration to the analogue quantity, but modified in amplitude by the digital quantity.

Figure 1:
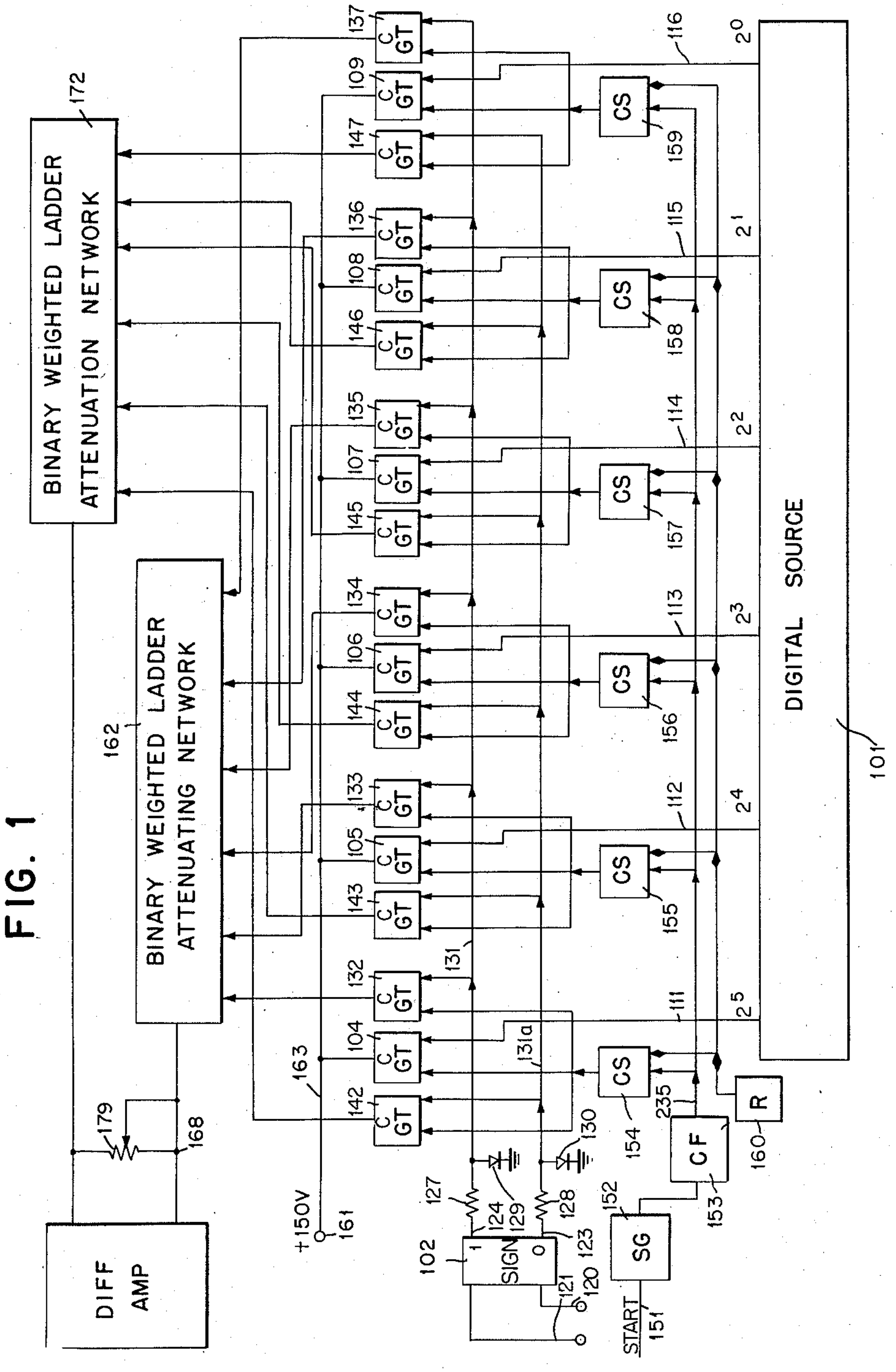
Fig. 1 illustrates in block form a preferred embodiment of the subject invention.

Referring now to the drawings and more particularly to Fig. 1 thereof, there is illustrated in block form a preferred embodiment of the subject apparatus. The digital quantity in the preferred embodiment is in the form of a six bit binary number, the six bits being known as information bits. An additional binary bit known as the Sign bit is employed to control the sign or polarity of the product signal by determining which of the two substantially identical attenuation networks is energized. As herein employed, the term "bit" refers to a binary signal, either a "1" or "0," in the digital number. The digital source, shown as block 101, may be any suitable register for storing binary data, the digital data to such a register being supplied, for example, by a digital computer. Since the manner in which information is supplied to the digital source is not considered material to the operation of the present invention, it is neither illustrated nor described.

Output conductors 111–116 representing the information bits from the most to the least significant are connected to associated current gate circuits shown as blocks 104 through 109 respectively. The information bits from the most to the least significant are labeled $2^5$ through $2^0$ to correspond to the binary digits of a digital number. In the preferred embodiment, the sign bit is shown emanating from a separate flip-flop 102, hereinafter referred to as the sign bit flip-flop, though it could be readily provided by an extra stage in digital source 101. The binary one output of the sign bit flip-flop supplies one of the inputs to current gate circuits shown as blocks 132 through 137, respectively, while the binary zero output from the sign bit flip-flop supplies one of the inputs to current gate circuits shown as blocks 142 through 147 respectively. In the preferred embodiment, flip-flop 102 is of the type wherein a positive signal applied to input conductors 120 or 121 produces a positive signal on the corresponding output conductors 123 or 124, respectively, and a negative signal on the opposite output conductor.

As will be more fully described hereinafter, the current gate circuits conditioned by the one and zero outputs of flip-flop 102 are connected to one of two substantially identical attenuation networks and thereby control the polarity of the output signal. With respect to the information bits from digital source 101, a negative signal on conductors 111 through 116 corresponds to a binary one, while a positive signal on the same conductors corresponds to a binary zero. In the preferred embodiment, a binary one signal is represented by a D.C. level of approximately −30 volts, while a binary zero signal is represented by a D.C. level of approximately +10 volts. The output levels of sign bit flip-flop 102 are substantially identical to those of digital source 101, depending on the state of the flip-flop, but the amplitude of the upper level or +10 volts is clipped at ground potential by diode clipping networks comprising resistors 127, 128 and associated diodes 129, 130, respectively.

Conductors 111 through 116 are connected to associated decoder stages, each decoder stage comprising three current gate circuits and an associated current source. Two of these three current gate circuits function as current switching devices to switch the analogue signal to the associated input of a ladder attenuation network in response to a negative signal from the associated output of digital source 101 and a positive conditioning signal from the sign bit flip-flop 102. The third current gate circuit in each decoding network, shown as blocks 104 through 109, is normally in the conduction state and functions as a shunt circuit to prevent current flow through either of the two companion current gate circuits.

Current gate circuits 104 through 109 are the shunt circuits associated with $2^5$ through $2^0$ information bits, respectively, current gate circuits 132 through 137 are associated with the lower attenuation network 162, while current gate circuits 142 through 147 are associated with the upper attenuation network 172. Each attenuation network, described in greater detail hereinafter, may be considered as comprising a plurality of binary weighted attenuation sections connected in tandem, the attenuation of attenuation networks 162 and 172 being weighted in successive binary steps in a ratio from $2^5$ through $2^0$ respectively. Thus the attenuation rates of the most significant binary bit to the least significant is 32 to 1.

Since the current gate circuits associated with the lower and upper attenuation networks are conditioned by opposite outputs of sign bit flip-flop 102, it is apparent that only the attenuation network selected by the sign bit can be energized during a particular multiplication cycle. Within the selected network, only the ladder attenuation sections associated with information bits having a negative signal thereon will be energized.

In response to a Start signal applied to conductor 151, sweep generator 152 generates a substantially linear sweep signal which is applied through cathode follower 153 to current sources designated as blocks 154 through 159. Current sources 154 through 159 are vacuum tube constant current sources of the type illustrated and described hereinafter with reference to Fig. 3. In the preferred embodiment, these current sources have two inputs, one of these inputs constituting a potential of approximately −160 volts from constant voltage source 160, which is applied to the control grids of all current sources. This voltage source 160 may be substantially identical to that identified as block 132, Fig. 1, in copending application Serial Number 595,993, "IBM" Docket 5292 filed by Henry E. Zieman et al. on July 5, 1956. The second current source input is the sweep signal generated by sweep generator 152 which is applied to the cathodes of the current source tubes. Voltage source 160 is On during normal operation to apply a potential to current sources 154 through 159.

From the above description, it is apparent that the output of current sources 154 through 159 is not constant with respect to time, but is made to increase linearly by the sawtooth voltage of sweep generator 152. The current sources are constant however, with respect to plate voltage variations of their component vacuum tubes. Each current source provides one input to three associated current gate tubes, so that current gate tubes 104 through 109, 132 through 137, and 142 through 147 have a sawtooth current waveform applied thereto.

The current gate tubes noted above are of the type illustrated and described hereinafter with reference to Fig. 3, wherein the output from the current sources is applied to the cathodes of the associated current gate tubes and the input to the control grids will be provided either by digital source 101 or sign bit flip-flop 102. As noted heretofore, current gate circuits 132 through 137 are conditioned by the binary one output of flip-flop 102, while current gate circuits 142 through 147 are conditioned by the binary zero output of flip-flop 102. Since only one set of current gate circuits can be conditioned at any one time, the particular state to which the flip-flop is set will determine which current gate circuits are conditioned.

A positive potential on any of conductors 111 through 116 will cause the associated current gate tubes 104 through 109 to conduct. However, the output of these current gate tubes is shunted through conductor 163 to B+, shown as terminal 161. As more fully described hereinafter, when these current gate tubes conduct, the negative bias on the two companion current gate tubes is increased sufficiently to prevent conduction until conduction in the shunt tube is terminated. For example, a positive signal on conductor 111 will cause current gate tube 104 to conduct. This increases the negative bias of its companion current gate tubes 132 and 142 thereby preventing conduction in either of these tubes while tube 104 is conducting.

As heretofore noted, a positive signal on conductors 111 through 116 designates a binary zero information bit, while a negative signal designates a binary one information bit. Assuming that digital source or register 101 is cleared prior to applying digtal information thereto, a positive signal exists on conductors 111 through 116 and current gate tubes 104 through 109 conduct. In response to a negative signal on any of conductors 111 through 116 indicating a binary one information bit, conduction in the associated current gate tube is terminated, thereby effectively decreasing the negative bias on the two companion current gate tubes. Depending on the state of the sign bit flip-flop, the companion current gate tube associated with the positive output therefrom will be conditioned to pass the sawtooth current waveform from the associated current source to the associated input of the ladder attenuation network to which it is connected. Assuming, for example, that a negative signal has been applied to conductor 111, current gate tube 104 is turned off. Assuming further that the sign bit flip-flop is in the "0" state, thereby applying a positive potential from conductor 123 to condition current gate tube 142, current gate tube 142 will conduct thereby gating the sawtooth current waveform from current source 154 to its respective input to ladder attenuation network 172. Since current gate circuits 142 through 147 are conditioned by the sign bit flip-flop under the present assumption, if a binary one signal is applied to any of the remaining conductors 112 through 116, the voltage developed across output terminals 178 and 168 will be proportional to the digital number in digital source 101.

Assuming that the reference potential at terminals 178 and 168 is on the order of +180 volts prior to conduction of the associated current gate tubes or a net potential of zero volts exists thereacross, the potential at the output terminals associated with the selected ladder attenuation network will be decreased in proportion to the product of the binary digit from digital source 101 and the sawtooth current signal from the current gate circuits. With respect to a common reference, the resulting potential developed when attenuation network 172 is energized may be considered negative, while the potential developed when attenuation network 162 is energized may be considered positive. Thus, when any of ladder sections in attenuation network 172 are energized in the manner heretofore described, the potential at output conductor 178 will decrease in proportion to the product of the binary digit and the analogue signal so that the output across terminals 178 and 168 will be negative. On the other hand, when any of the ladder sections within attenuation network 162 are energized, the potential at output terminal 168 is reduced in proportion to the product of the binary digit and sawtooth waveform so that the output potential across output conductors 178 and 168 will be positive. Thus, the potential developed at output terminals 178 and 168 may vary either positively or negatively in proportion to the product of the two signals applied thereto.

The operation of the subject apparatus may be understood more clearly by use of an example. Consider that the binary input number is 011001, corresponding to decimal number 25, and the sign bit "1." Conductors 111, 114 and 115 have a positive potential thereon corresponding to binary zero, while conductors 112, 113 and 116 have negative potentials thereon corresponding to binary one. Current gate tubes 132 through 137 are conditioned by the binary "1" output of sign bit flip-flop 102. In the manner heretofore described, conduction through current gate circuits 105, 106 and 109 is terminated by the negative potential on the corresponding conductors 112, 113 and 116, respectively.

In response to a Start signal on conductor 151, a sweep signal is generated by sweep generator 152 and applied through cathode follower circuit 153 to current sources 154 through 159. The second input to the current source is provided by constant voltage source 160. Due to the termination of conduction of shunt current gate circuits 105, 106 and 109, current gate circuits 133, 134 and 137, conditioned by the binary one output of the sign bit flip-flop, conduct and apply the sawtooth current waveform from their respective current sources 155, 156 and 159 to the associated inputs of attenuation network 162. In accordance with the binary weighting of the attenuation network, the attenuation presented by the attenuation sections connected to sources 155, 156, and 159 corresponds to 16, 8 and 1, or 25 units of attenuation. Since a substantially identical current waveform is applied to all ladder sections, the resulting positive potential developed across the output terminals will correspond to the product of 25 and the sawtooth current analogue signal. The resulting output at terminals 178 and 168 may indicate the product directly, through a suitably calibrated indicator, for example, or may vary as a function of the product. On the other hand, if the sign bit was zero and the information bits remained the same as in the present example, the potential at terminal 178 would be decreased by a corresponding amount as terminal 168 in the present instance and the output potential across terminals 178 and 168 would be equal in magnitude but opposite or negative in polarity to that above described. Potentiometer 179 provides a variable termination for the output signal.

Figure 2:
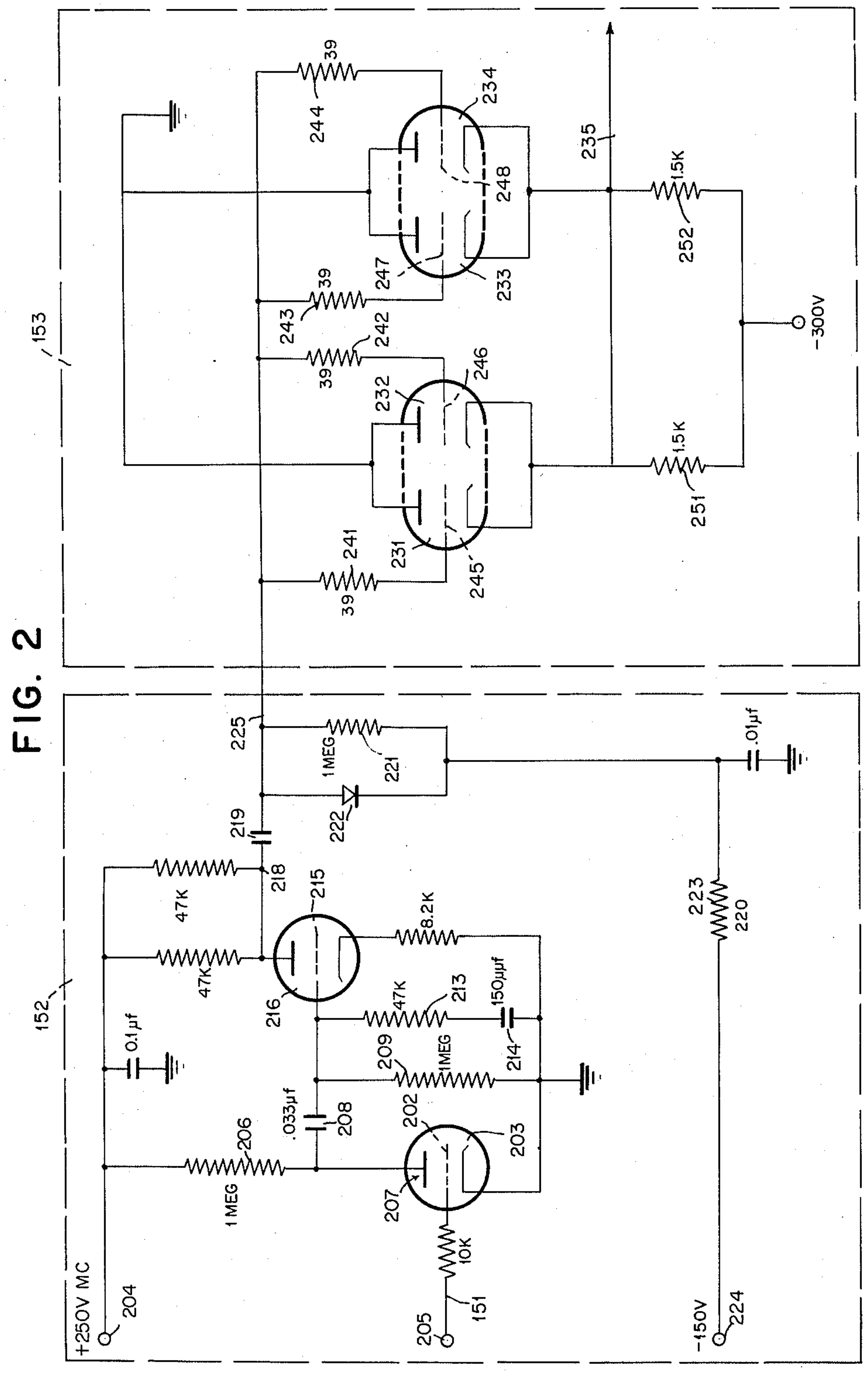
Fig. 2 illustrates in schematic form the sawtooth generator and associated cathode follower shown as blocks 152 and 153 in Fig. 1.

Referring now to Fig. 2, there is illustrated in schematic form the sweep generator and associated cathode follower circuit shown as blocks 152 and 153 in Fig. 1. Prior to application of a Start signal on conductor 151, a positive D.C. level will be applied to control grid 202 of triode 203 from a terminal 205, causing plate current to flow from the positive supply terminal 204 through resistor 206 to anode 207. Due to the magnitude of resistor 206, approximately 1 megohm, the potential at anode 207 approaches a nominal order of magnitude of +10 volts. Anode 207 is connected to one side of capacitor 208, the other side of which is connected through resistor 209 to ground. Thus, a potential on the order of 10 volts is across capacitor 208 prior to a Start signal being applied to terminal 205.

When a negative Start signal is applied via terminal 205 and conductor 151 to control grid 202 of vacuum tube 203, tube 203 is cut off. Current will now flow from positive terminal 204 through resistor 206, capacitor 208 and resistor 213 to charge capacitor 214. The initial flow of current through this circuit generates a positive step function in the output sweep signal which, when suitably power amplified through cathode follower circuit 153, is sufficient in magnitude to initiate conduction in the current source circuits. When current flow through resistor 213 to capacitor 214 decreases and vacuum tube 203 is cut off, a potential at anode 207 and across capacitor 204 which is applied to control grid 215 of amplifier 216 rises in a substantially linear manner. Amplifier 216 effectively functions as an inverter whereby the resulting output signal appearing at terminal 218 in the anode circuit is a negative sweep signal varying between levels of approximately +230 volts and +100 volts.

Conductor 225 and the associated side of capacitor 219 are normally at a potential of −150 volts provided by −150 volt supply 224. As the voltage at terminal 218 and the associated side of capacitor 219 varies between the above noted levels of approximately +230 and +100 volts or a 130 volt swing, the potential at conductor 225 swings accordingly from approximately −150 to −280 volts. During this sweep period capacitor 219 becomes slightly discharged due to current flow through resistor 221. During the positive step function of the sweep signal, to prevent the potential at conductor 225 from rising above −150 volts, diode 222 functions as a clipping diode to clip the upper level of the potential on conductor 225 at −150 volts. This resultant signal on conductor 225 is then applied to cathode follower circuit 153.

Cathode follower circuit 153 effectively comprises four substantially identical parallel connected vacuum tubes 231 through 234 which provide a power amplified sweep signal on output conductor 235. Considerable power amplification is provided by this arrangement, since in a particular embodiment the output signal may be applied to the deflection plates of a plurality of cathode ray situation display tubes. The output from the sweep generator is applied through parasitic resistors 241 through 244 to control grids 245 through 248 of vacuum tubes 231 through 234, respectively. Vacuum tubes 231, 232 and 233, 234 constitute duo-triodes having cathode resistors 251 and 252, respectively. The output developed across these resistors is applied through conductor 235 to the cathode circuit of current sources 154 through 159 in the manner illustrated and described hereinafter with reference to Fig. 3.

Figure 3:
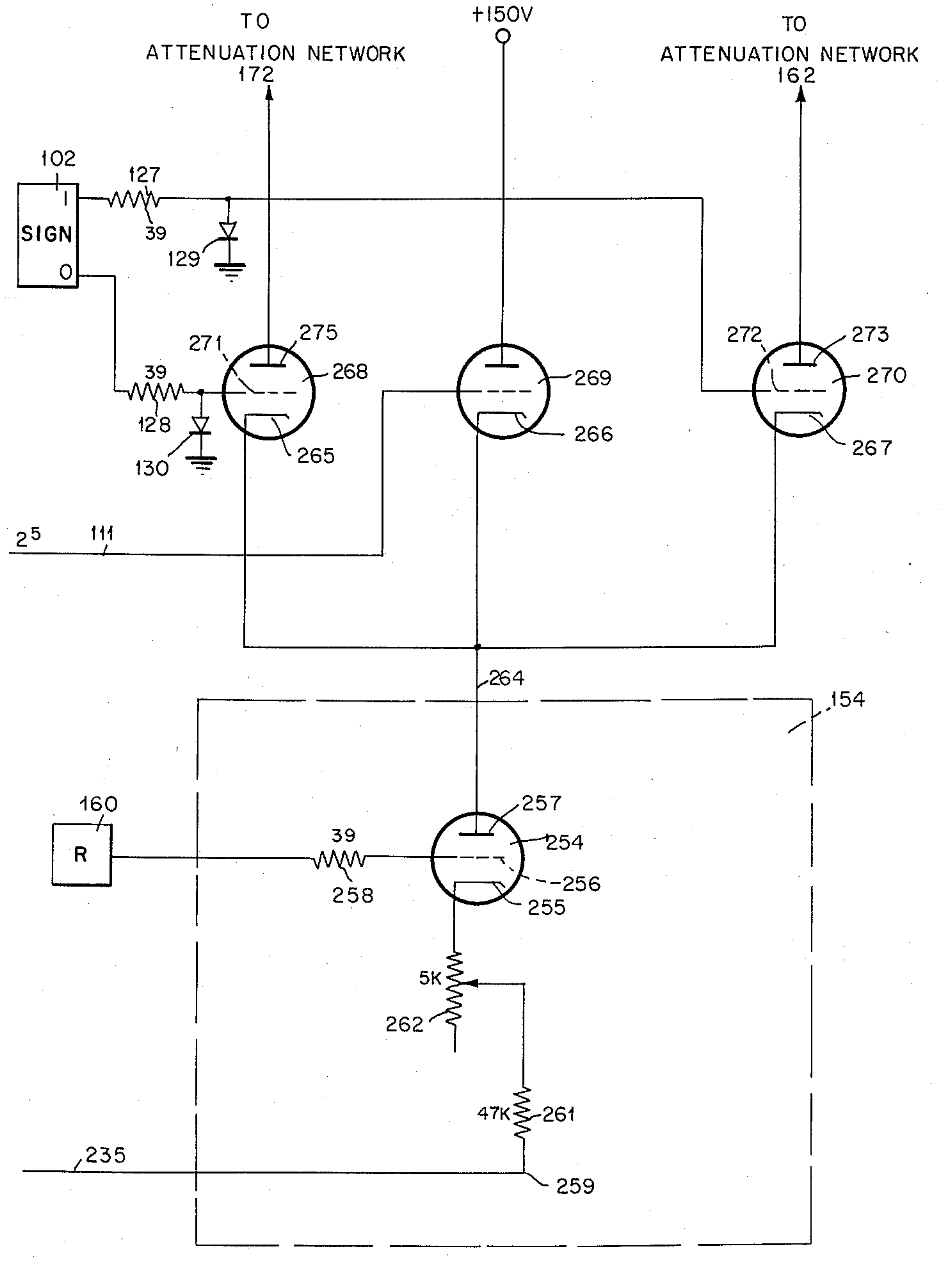
Fig. 3 illustrates in schematic form a single stage decoding circuit including a current source circuit and associated current switching circuits.

Referring now to Fig. 3, there is illustrated in schematic form one of the decoding circuits shown in block form in Fig. 1 comprising current source 154 and its associated current gate circuits 142, 104 and 132. Since the apparatus includes six substantially identical decoding circuits, a description of one will suffice for an understanding of all.

Current source 154 includes vacuum tube 254 having a cathode 255, a control grid 256 and an anode 257. A stabilized voltage source 160 having an amplitude of approximately −160 volts is connected through parasitic suppressor 258 to control grid 256 of vacuum tube 254 and functions to maintain a constant bias on the control grid of the current source circuits despite any variation in plate potential. The sweep signal output from cathode follower circuit 153 is applied through conductor 235, terminal 259, resistor 261 and potentiometer 262 to cathode 255 of current source tube 254. As the sawtooth potential is applied to terminal 259, the cathode being clamped by the grid 256 by conventional cathode follower action, the potential at terminal 259 resulting from the sawtooth potential increases as the voltage across resistors 261 and 262 increases and the plate current increases in a substantially sawtooth fashion. The resulting sawtooth current waveform at anode 257 is then applied to cathodes 265, 266 and 267 of current gate tubes 268, 269 and 270. If the potential on input conductor 111 is +10 volts, corresponding to binary 0, current gate tube 269 conducts, thereby preventing either companion gate tube 268 or 270 from conducting. If the potential on conductor 111 is −30 volts corresponding to binary 1, conduction is terminated in current gate tube 269. Depending on the state of sign bit flip-flop 102, a potential of approximately zero volts (ground potential) will be applied to the control grid of one of current gate tubes 268 or 270, while a negative potential of −30 volts will be applied to the other. If sign bit flip-flop 102 is in the binary zero state, current gate tube 268 will conduct and provide a sawtooth current waveform at the anode 275. If sign bit flip-flop 102 is in the binary one state, current gate tube 270 will conduct and provide a sawtooth current wave-form at anode 273. The current gate tubes function as inverters whereby the output signal on anodes 273 or 275 corresponds to a positive sawtooth signal. Since current gate tubes 268 and 270 are conditioned by opposite outputs of the sign bit flip-flop, it is apparent that only one of these gate tubes can be conducting at any given interval.

Sign bit flip-flop 102 may be any suitable flip-flop circuit which when energized by a 0.1 microsecond pulse produces two output signals having amplitudes of approximately −30 volts and ground potential respectively, and is preferably the Model C flip-flop shown in copending application Serial Number 494,982 ("IBM Docket" 4490), "Magnetic Data Storage," filed by R. R. Everett et al. on March 17, 1955.

One of the many uses wherein a multiplier circuit of this type may be employed is in a circuit for generating vectors on a cathode-ray tube; for purposes of discussion, such circuit is termed a Vector Generator. The Vector Generator essentially comprises two independent but substantially identical digital-analogue multiplier circuits of the type heretofore described. The outputs of the multiplier circuits, after being suitably amplified by a differential amplifier, are applied to the deflection plates of a situation display cathode ray tube. Assuming the C.R.T. beam is unblanked, the Vector Generator causes the beam to be so deflected as to generate a vector on the face of the C.R.T. While any conventional cathode ray tube may be employed, the C.R.T. tube employed in the preferred embodiment is preferably of the type illustrated and described generally in copending application Serial Number 573,991, "Convergence Current Regulator", filed by Edwin J. Smura on March 26, 1956, now Patent No. 2,914,698. Although the reference position of the beam producing the vector may be controlled in various ways, in the preferred embodiment a point character is generated in the manner described in said copending application Serial Number 595,993 ("IBM" Docket 5292), and is then deflected from the reference position along a path defined by the deflection potentials generated by the two digital-analogue multiplier circuits. This deflection of the point character leaves a trace of light on the screen of the C.R.T., thereby generating a visible line having both direction and length representative of a vector. Thus the vector essentially comprises the product of two potentials which is applied across the horizontal plates, and the product of two potentials which is applied across the vertical plates, and the resultant deflection of the beam determines the sense and magnitude of the vector.

Assuming the face of the cathode ray tube to be divided into four quadrants, the particular quadrant in which the vector is positioned is determined by the signal applied to the sign bit flip-flops. Since the state of the sign bit flip-flop determines the polarity of the output potentials and since both deflection potentials may be of either polarity and of any magnitude within the limits of the digital data, the vector may be of any length and of any direction. Assuming the reference point is the center of the screen of the C.R.T., a vector positioned in the northeast quadrant indicates both the horizontal (X) and vertical (Y) deflection potentials are positive; a vector in the northwest quadrant indicates negative X and positive Y deflection potentials; a vector in the southwest quadrant indicates negative X and Y deflection potentials, while a vector in the southeast quadrant indicates positive X and negative Y deflection potentials. The deflection potentials, as noted, correspond in polarity to the state of the associated sign-bit flip-flops.

Summarizing the above description, it is apparent that the Vector Generator comprises two digital-analogue multiplier circuits, each circuit generating a potential corresponding to the product of a digital quantity and an analogue quantity. When the product signals are applied to associated difference amplifiers, the output from the difference amplifier constitutes deflection signals which cause the C.R.T. beam to trace a path defined by the product signals. The resultant outline on the screen of a cathode ray tube represents a vector.

Figure 4:
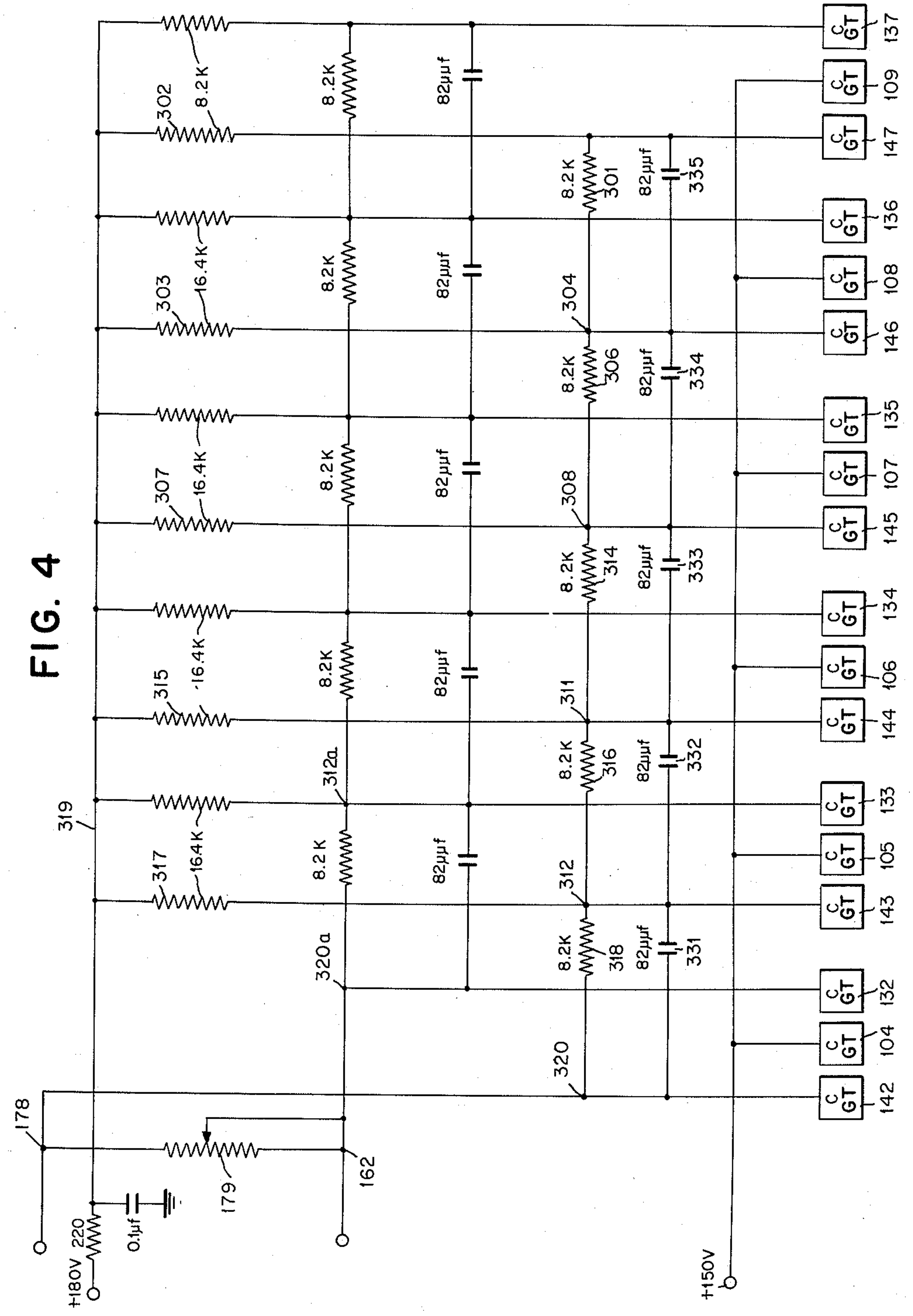
Fig. 4 illustrates in schematic form the attenuation networks and their respective inputs shown in block form in Fig. 1.

Referring now to Fig. 4, there is illustrated in schematic form the ladder attenuation networks illustrated as blocks 162 and 172 in Fig. 1. The attenuation networks employed in the preferred embodiment are variably terminated weighted networks wherein the potential developed at the output is binary weighted in accordance with the relative significance of the associated digit of the digital quantity. Under a binary weighting scheme, the potential developed by the most significant digit, $2^5$, is thirty-two times the potential developed by the least significant digit, $2^0$.

The binary weighted ladder attenuation network may be considered as comprising individual ladder sections, each section consisting of combinations of R and 2R resistors arranged to produce the desired weighting, together with capacitors to increase the response time of the associated sections and thereby provide for the simultaneous coincidence of all binary weighted signals at the output terminals of the network. In the preferred embodiment, the value of R is 8.2K ohms, that of 2R is 16.4K ohms.

To provide the desired voltage output, a relatively high impedance should be provided to the current sources representing the most significant digit. While in the preferred embodiment the analogue signal is represented by a varying current applied from the selected current gate circuits to the associated inputs to the attenuation network, the current applied to all inputs is substantially identical; thus the potential developed within the network will correspond directly to the impedance of the network at the digit entry points. In the preferred embodiment, assuming that the terminating impedance is infinite, the impedance presented to current gate circuits 142 and 132 is 2R ohms, that of current gate circuits 143 and 133 R ohms, that of current gate circuits 144 and 134 ¾R ohms, etc., until the impedance to current gate circuits 147 and 137 representing the least significant digit is $\frac{171}{256}$R ohms. The ensuing description will include an analysis of the network from the inputs of the three most significant digits as illustrative of the preferred embodiment, such analysis including a formula for determining the impedance of the network at any given input.

Referring now to the most significant digit, $2^5$, the equivalent impedance of the attenuation network 172 presented to current gate circuit 142 is best determined by starting an analysis of the network from the least significant digit. Resistors 301 and 302 in series=2R, which in parallel with 2R resistor 303 constitutes an equivalent impedance of R ohms at terminal 304. This impedance R combined with that of series resistor 306 is 2R ohms, which in parallel with 2R resistor 307 constitutes an equivalent impedance of R ohms at terminal 308. In like manner the equivalent impedance of the network at terminals 311 and 312 resulting from newly added resistors 314, 315 and 316, 317 respectively, is R ohms. The impedance value noted at these terminals is with respect to conductor 319. The final impedance at terminal 320 is equal to the sum of the impedance at terminal 312, R ohms, and that of resistor 318, also R ohms, or an equivalent impedance of 2R or 16.4K ohms. Since the attenuation networks are substantially identical, the impedance at the corresponding terminal **320*a* of attenuation network 162 is identical to the impedance at terminal 320**.

Turning now to the impedance presented to the next less significant digit, $2^4$, it is noted from the preceding description that the equivalent impedance of attenuation network 172 at terminal 312 is R or 8.2K ohms. With respect to the input at terminal 312, resistor 318 is effectively open since the terminating resistor was considered infinite and the output impedance of the current gate tubes is in the order of 10 megohms, so the impedance of the attenuation network at terminal 312 is R or 8.2K ohms. In like manner the impedance presented by attenuation network 162 to current gate circuit 133 at terminal **312*a*** is R or 8.2K ohms.

Turning now to the next less significant or $2^3$ digit, the impedance presented to current gate circuit 144, as heretofore noted, is ¾R. From the preceding description it will be appreciated that the impedance of attenuation network 172 at terminal 311 is R ohms. With resistor 318 effectively open, the impedance of the remainder of the circuit is the sum of R and 2R resistors 316 and 317 respectively or a total impedance of 3R ohms. The resultant impedance of R in parallel with 3R is ¾R. Therefore the voltage produced at terminal 311 due to a current I from current gate circuit 144 is ¾IR. Because of the resistive divider action of resistors 317 and 316, the voltage produced at output terminal 320 is only ⅔ of the voltage at terminal 311, or ⅔ of ¾IR, or IR/2. The impedance presented to the output terminal for a particular input may be considered the transfer impedance. In the present example, while the input impedance is ¾R, the transfer impedance is R/2 ohms. Capacitors 331 through 335, connected across the series resistors in the manner shown, function to increase the response time of their associated attenuation sections and thereby provide for the simultaneous coincidence of all decoded signals at the output terminals of the network. In like manner a capacitor is connected across each of the series resistors in attenuation network 162.

The impedance $R_j$ at any input $j$ of the attenuation network may be determined by the formula $$R_j=\frac{2R}{K+4}\left[\frac{(2^{2j-1}+1)(K+4)-3}{3\times 2^{2j-1}}\right]$$

where $0\leqslant j\leqslant n$ wherein

R is the value of a resistor arm in the ladder attenuation network, $j$ is a running constant having values between 0 and 5 corresponding to inputs from the most significant to the least significant digits respectively, K is the ratio of the value of the output impedance divided by R, $n$ is the total number of stages in the ladder network.

To determine the impedance at a particular point, assume in the above equation that $K=\alpha$, i.e., that the output impedance is an open circuit. Under this assumption, $$R_j=\frac{2R}{3}\left(1+\frac{1}{2^{2j-1}}\right)$$

Checking this equation for the impedance presented to the most significant digit input, $j=0$ $$R_j=2/3R\left(1+\frac{1}{2^{-j}}\right)=2/3R(1+2)=2R \text{ ohms}$$

For the succeeding less significant digit, $j=1$, $$R_j=2/3R\left(\frac{1}{1+2^{1}=}\right)=2/3R\times\frac{3}{2}=R \text{ ohms}$$

For the next succeeding less significant digit, $j=2$ $$R=2/3R\left(1+\frac{1}{8}\right)=\frac{2R}{3}\times\frac{9}{8}=3/4R \text{ ohms}$$

The impedance of the remaining input terminals may be found in a similar manner. However, it will be recognized from the preceding description that the binary weighting is not achieved solely by the impedance of the network at a particular input but also by the divider action of the preceding sections. In the last described example, the impedance of the network was ¾R, while the binary weighted value of output voltage at that point is IR/2. However, the effective transfer impedance at the output terminals of the network was ⅔ of ¾R, or R/2 ohms. The impedance of the last three sections of the attenuation network can likewise be determined in the above described manner.

Summarizing the manner in which multiplication takes place in the subject apparatus, the sign bit selects the particular attenuation network to be energized by conditioning associated gate circuits and thereby determines the sign or polarity of the product signal. The digital signals representing an arbitrary binary number such as binary one cause a common analogue signal to be converted to a corresponding current waveform and applied to the associated input of the binary weighted attenuation network selected by the sign bit. A potential corresponding in magnitude to the product of the digital and analogue signal is developed within the network and appears at the common output circuit of the attenuation networks.

While a six stage decoding network has been described in the preferred embodiment as illustrative of the principles of the subject invention, it will be readily apparent that the attenuation network may be extended or abridged in accordance with the magnitude of the digital quantity comprising one of the components in the multiplying operation.

While the digital quantity has been illustrated and described in the preferred embodiment as a binary number, the principles of the present invention are applicable to numbers having a radix other than two. Similarly, while the analogue quantity has been described as a saw-tooth current waveform in the preferred embodiment, it could comprise any variable signal or any physical movement which could be converted to an analogue signal.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A multiplier circuit for generating a signal corresponding in sign and magnitude to the product of a digital and a linearly varying analogue quantity comprising a first and second binary weighted attenuation network having a common output circuit, each of said networks having an input for each digit in said digital quantity, means for providing a potential whose magnitude varies as a function of said analogue quantity, means for converting said analogue potential to a current having substantially identical waveform characteristics and means responsive to the binary condition of one of said digital signals to selectively apply said current to the inputs of one of said attenuation networks in accordance with the value of said digital quantity and to prevent current being applied to the other of said networks whereby the potential developed at said output circuit corresponds in sign to and varies in correspondence with the product of said digital and analogue quantities.

2. A digital-analogue multiplier circuit comprising means for providing a saw-tooth potential representative of an analogue quantity, means for providing a source of binary signals representative of a digital quantity, first and second binary weighted attenuation networks having a common output circuit, each of said networks having an input for each binary digit in said digital quantity, means for converting said analogue potential to an analogue current having substantially identical waveform characteristics, means responsive to a given value of one of said digital signals for causing said analogue current to be selectively applied to inputs of one of said attenuation networks and to another value of said one of said digital signals for causing said analogue current to be selectively applied to inputs of the other of said attenuation networks in accordance with the sign of said digital quantity whereby the resulting potential at said output circuit corresponds in sign to and varies in correspondence with the product of said digital and analogue quantities.

3. A device of the type claimed in claim 2 wherein said last named means comprises a plurality of current gate circuits, each of said current gate circuits controlling an associated input to one of said networks, the current gate tubes associated with one of said networks being conditioned when said one of said digital signals is said given value to pass said sawtooth current to its associated input in said attenuation network.

4. A digital-analogue multiplier circuit for generating a signal representative of the product of a digital quantity and an analogue quantity comprising a source of binary signals, a source of an analogue signal represented by a potential having a linearly varying value with respect to time, first and second binary weighted attenuation networks, a common output circuit associated with said networks, each of said networks including a plurality of attenuation circuits connected in tandem, each attenuation circuit in one of said networks having a corresponding attenuation circuit in the other of said networks, an input terminal associated with each of said attenuation circuits means for converting said analogue potential to an analogue current having substantially the same waveform characteristics as said potential, and means for selectively applying said current to one of each pair of said corresponding circuits in accordance with said binary signals whereby the resulting potential at said output circuit varies in correspondence with the product of said digital and analogue quantities.

5. The circuit as claimed in claim 4 wherein said means for selectively applying said current includes a plurality of current gate circuits, a first group of gate circuits including one associated with each input terminal and a second group of gate circuits including one associated with each pair of corresponding input terminals, said second group being adapted to control the application of said analogue current to each pair of said first group in response to said binary signals and said first group being adapted to control the application of said analogue current to said input terminals.

6. A circuit as claimed in claim 4 which is adapted to be connected to opposite deflection plates of a cathode ray tube to provide a varying potential for deflecting the beam in producing a vector, wherein said digital quantity corresponds to one of the cartesian coordinates of a terminal of said vector and said analogue signal is an analogue of said varying potential.

References Cited in the file of this patent

UNITED STATES PATENTS

| | | |
|---|---|---|
| 2,415,190 | Rajchman | Feb. 4, 1947 |
| 2,537,427 | Seid | Jan. 9, 1951 |
| 2,538,615 | Carbrey | Jan. 16, 1951 |
| 2,610,295 | Carbrey | Sept. 9, 1952 |
| 2,685,084 | Lippel | July 27, 1954 |
| 2,715,678 | Barney | Aug. 16, 1955 |
| 2,738,504 | Gray | Mar. 13, 1956 |
| 2,775,727 | Kernahan | Dec. 25, 1956 |
| 2,827,233 | Johnson | Mar. 18, 1958 |

OTHER REFERENCES

Moore School of Electrical Engineering of U. of Penn., "Theory and Techniques for Design of Electronic Digital Computers," Volume III, June 30, 1948, pages 33-1 to 33-44.

Packer: "Dynamic Binary Counter With Analog Read-out," Part VII, Convention Record of the March 23-26 IRE National Convention, April 1953, pages 13-19.

O'Neil: "Networks for Digital-to-Analogue Shaft Position Transducers," AIEE Transactions, Volume 73, Part I, March 1954, pages 456-466.